Jan. 22, 1963  A. J. WILTSHIRE  3,074,111
APPARATUS FOR MAKING A RESIN-BONDED FIBER GLASS CONE
Filed Nov. 24, 1958  3 Sheets-Sheet 1

INVENTOR.
ARTHUR J. WILTSHIRE
BY
RICHEY, McNENNY & FARRINGTON
ATTORNEYS

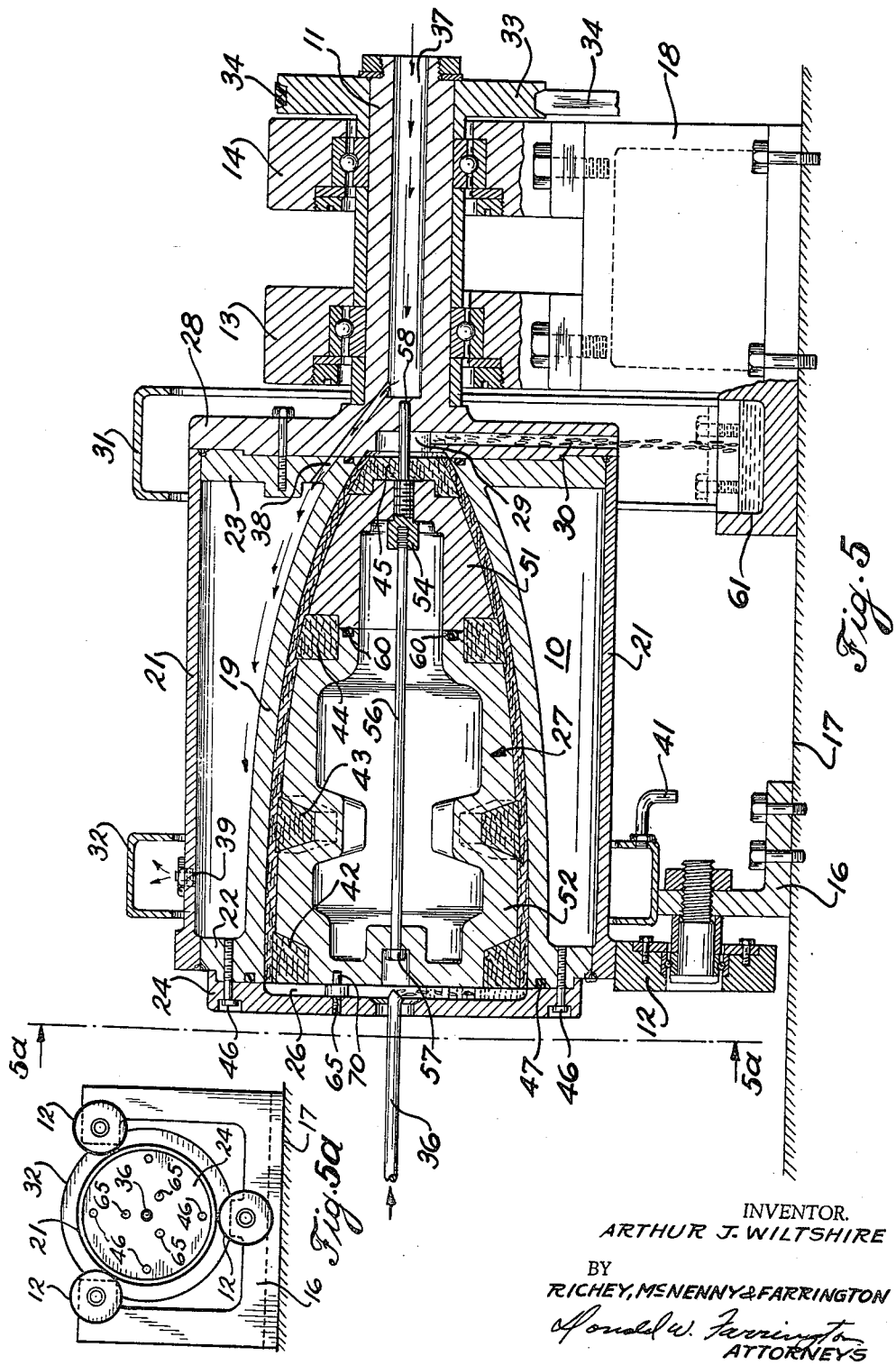

3,074,111
APPARATUS FOR MAKING A RESIN-BONDED FIBER GLASS CONE

Arthur J. Wiltshire, Richmond Heights, Ohio, assignor to White Sewing Machine Corporation, Lakewood, Ohio, a corporation of Delaware
Filed Nov. 24, 1958, Ser. No. 775,776
3 Claims. (Cl. 18—26)

This invention relates to apparatus for making fiber glass articles and more particularly to apparatus for making a torpedo tail cone made of fiber glass.

The advantages of fiber glass structures, particularly in connection with the use of such structures in and around salt water, have been recognized. Using the apparatus of the present invention a conical shell suited for use as a torpedo tail cone is constructed so as to provide internal ribs to reinforce the conical shell against high external pressures. Preferably the conical shell is initially formed of chopped lengths of fiber glass distributed in a random pattern on a mandrel or pattern generally corresponding to the finished article. One method which has been employed for the preliminary form or, as it is known in the trade, the "pre-form," involves the blowing of chopped glass fibers against a foraminous structure shaped to conform generally to the finished article. Usually a vacuum is arranged within the foraminous structure to insure that the chopped fibers blown against the form will be retained in position. Such a pre-form is often lightly sprayed with resin so as to facilitate the handling of the pre-form which may be placed in a mold. Alternatively the pre-form for the conical shell may be made by the use of fiber glass mat which is made up of short lengths of chopped fiber glass in a random lay pattern and held together or held in position by a light spray of resin. Such fiber glass mat is available to the trade in various thicknesses. When the mat method is employed a pattern is cut out of the mat so as to provide a generally conical structure which may be placed in a conical mold for finishing the completed tail cone or conical shell.

It is among the objects of my invention to provide an apparatus for making a torpedo tail cone made of resin-bonded fiber glass and having reinforcing ribs and structural supporting elements bonded to the fiber glass walls of the shell at the interior of the shell.

It is a further object of my invention to provide an apparatus for making a torpedo tail cone according to the preceding object wherein the resin is introduced to the glass fiber pre-form while in a mold which is shaped like the tail cone and wherein the mold is rotated so that centrifugal force occasioned by the rotation drives the resin into all of the fibers so as to produce a dense, rigid structure.

It is a further object of my invention to provide an apparatus for making a torpedo tail cone according to the preceding objects wherein the resin is introduced into the mold for the tail cone in a manner which will remove the air from the mold cavity and in a manner so that all the voids in and around the glass fibers are effectively filled with resin and wherein the mandrel for the interior of the conical shell is made of a low melting point alloy so that intricate shapes on the interior of the cone may be provided and yet the mandrel may be easily removed from the finished article.

Further objects and advantages will appear from the following description and the appended drawings wherein:

FIG. 5 is an elevation in section of one form of the apparatus of my invention;

FIG. 5a is an end view of the apparatus taken as indicated at 5a—5a of FIG. 5.

Figure 2:
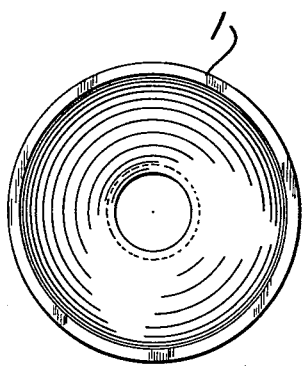
FIG. 2 is an end elevation of the conical shell shown in FIG. 1.
Figure 1:
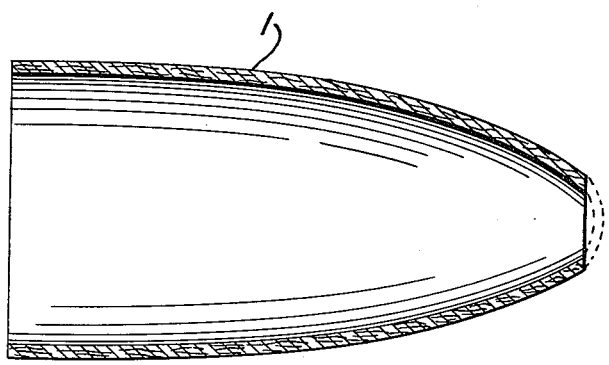
FIG. 1 is a sectional view of a conical shell made using the apparatus according to my invention.

Referring to the drawings, a simple form of conical shell structure is illustrated in FIG. 1 wherein the conical wall 1 is formed of fiber glass and resin cured under heat and pressure to provide a rigid supporting structure.

Figure 4:
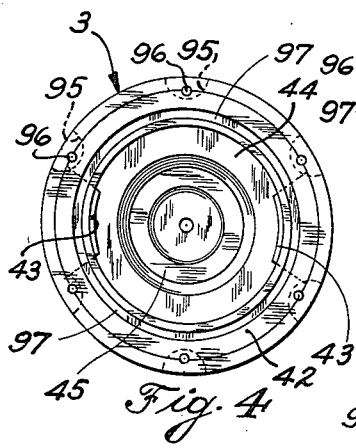
FIG. 4 is an end elevation looking into the torpedo tail cone of FIG. 3.
Figure 3:
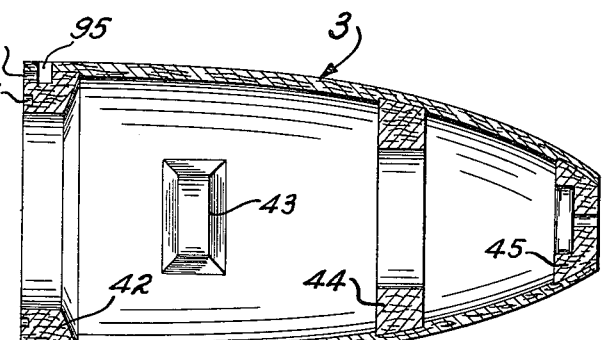
FIG. 3 is a transverse sectional view of a torpedo tail cone made using the apparatus according to my invention.
Figure 3A:
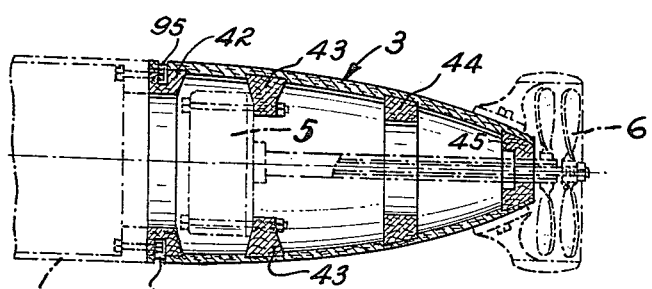
FIG. 3a is a view similar to FIG. 3 showing the torpedo tail cone assembled with the body of the torpedo and wherein the cone structure supports drive mechanism for the torpedo.

The preferred form of torpedo tail cone is the shell structure 3 indicated in FIGS. 3, 3a and 4, having an annular rib 44 near the small end of the shell 3 at the interior thereof, a closure member 45 bonded to the interior of the tail cone at the small diameter end thereof and an annular rib 42 at the large diameter end of the tail cone 3. The wall of the tail cone 3 is preferably slotted as indicated at 95 to facilitate the securement of the tail cone 3 to the body 4 of the torpedo as indicated in phantom outline in FIG. 3a. The segmental members 43 are secured to the interior of the tail cone at opposite sides thereof to provide mounting bosses for the drive motor 5 and the driving shafts extend from the drive motor 5 through the closure member 45 to the torpedo propellors indicated at 6.

Preferably the making of the tail cone is initiated by making a pre-form of a generally conical shape so as to fit within the mold 19 of the apparatus illustrated in FIG. 5. A mandrel indicated in its entirety as at 27 comprises a large diameter section 52 and the complementary small diameter section 51. The sections 51 and 52 are made of a low melting point alloy such, for example, as an alloy made of tin and bismuth which will become fluid at a temperature of about 281° F. Such alloys are available under the trade-name "Cerrotrue."

The two sections 51 and 52 forming the mandrel 27 at the interior of the tail cone are recessed to receive the reinforcing ring 42 at the large diameter, the reinforcing ring 44 near the small diameter and the closure member 45 at the end of the tail cone. Preferably the rings 42 and 44 are wound to the form shown in the drawings from a continuous strand of resin-impregnated fiber glass and are cured to substantially the form shown and are then assembled with the mold mandrel 27 before the mandrel is arranged within the mold 19. Similarly the segmental bosses 43 and the end member 45 are molded and cured to form before being placed on the mandrel 27 and arranged within the mold 19. The members 42, 43, 44 and 45 may also be made of aluminum and such parts when made of aluminum are etched to facilitate the bonding of the parts to the interior of the torpedo tail cone upon the introduction of resin in the mold.

As illustrated the outer diameter of the parts 42, 43 and 44 is such as to project slightly beyond the curved outline of the mandrel 27 so that when the entire tail cone is impregnated with resin, such ring members 42—44 and the supporting bosses 43 will be bonded and locked within the wall of the tail cone unit.

The apparatus of FIG. 5 includes a support 16 which is of generally U-shaped construction so as to embrace the larger diameter end of the mold for the tail cone. Supporting rollers 12 are journalled on the U-shaped support 16 at spaced points as illustrated in FIG. 5a so that the periphery of the rollers will bear against the circular exterior of the end of the housing 21. The right-hand end of the housing 21 as (viewed in FIG. 5) is provided with a cover plate 28 having a hollow stem 11 projecting axially from the center of the cover plate 28. The hollow stem 11 is supported in the bearing blocks 13 and 14 and the outer end of the stem is provided with a pulley 33 and belt 34 driven by a motor (not shown) so as to rotate the mold housing 21. The large diameter end of mold 19 is provided with a flange 22 welded to the housing 21. The mold is provided with a flange or plate 23 at the right-hand end thereof which is welded to the housing 21 and is bolted to the plate 28. The housing 21 and the mold 19 therein rotate when driven by the belt and pulley 34—33.

The mandrel 27 of the mold is supported at the small diameter end thereof by the unthreaded shank of bolt 58 which is threaded into the mandrel section 51 and projects therefrom into an axial opening in the center of the disc 45 and the plate 28. The other end of the mandrel 27 is supported by spaced pins 65 which are carried by the cover plate 24. The inner ends of the pin 65 have reduced portions adapted to be received by spaced openings 70 in the end face of the mandrel section 52. A tie bolt 56 is arranged axially within the mandrel 27 and by turning the head 57 on the bolt 56 it is threaded into the head 54 of the bolt 58 so as to pull the two mandrel sections 51 and 52 into tight engagement. A gasket such as 60 may be arranged on the flat abutting end faces of the sections 51 and 52 to facilitate the sealing of the parts to each other in assembled relation. After the mandrel 27 is arranged within the loose fibrous pre-form for the conical shell housed within the mold 19, the cover plate 24 is secured as indicated at 46 to the flange 22 of the mold 19. Preferably an annular gasket 47 is arranged at the flat mating faces of the cover plate 24 and the flange 22. At that end of the rotating mold assembly adjacent the small end of the cone, a casing 31 surrounds the rotating mold assembly so as to receive liquid resin which may be conducted out of the mold through the passageways 29 and 30 formed in the cover plate 28. It will be noted that the passageway or cavity 29 opens into the space between the mandrel 27 and the mold 19 at the small end of the cone.

A similar casing 32 surrounds the rotating mold assembly near the large diameter end of the cone and this casing is arranged to catch moisture discharged from the chamber 10 around the mold 19 during the curing of the resin-bonded structure within the mold. Such moisture is conducted out of the channel 32 by way of the pipe 41 to a drain.

The cover plate 24 is centrally apertured to receive a liquid resin inlet pipe 36. When the parts are assembled as above described, liquid resin is introduced into the mold cavity by way of the pipe 36. Such resin is preferably an epoxy resin which will be polymerized under conditions of heat and pressure obtained within the mold. Other resins such as polyester resin or phenolic resins may be used. As the liquid resin is introduced, it is moved outwardly to the largest diameter of the conical cavity and fills all of the voids of interstices between each of the chopped fibers in the pre-form. Resin is continually introduced and is forced down along the wall of the conical cavity pushing the air out ahead of the resin so that the air is exhausted from the mold cavity through chamber 29 and passageway 30.

The rotation of the mold assembly provides the centrifugal force necessary to form a dense composition of fiber and resin throughout the wall structure and, when the conical cavity is completely filled, liquid resin will begin to escape through the passageway 30. When this occurs steam at about 25 pounds per square inch pressure and at a temperature of between 220° F. and 250° F. is introduced into the hollow stem 11 by way of the passageway 37. The passageway 37 leads the steam through the cover plate 28 and through passageway 38 into the chamber 10 surrounding the mold 19. This temperature is maintained during the curing or polymerization of the resin in the mold cavity.

After the tail cone is completely cured it is withdrawn from the mold 19 by removing the cover 24 and pulling the mandrel 27 out through the large diameter end of the mold 19. This assembly of finished or cured tail cone and mandrel 27 is then placed in a vertical position with the large diameter end down in a steam chamber providing steam at about 50 pounds per square inch and a temperature of about 300° F. At this temperature the low melting point alloy of which the mandrel 27 is made will become fluid and such fluid will flow out through the open end of the shell. The molten metal may be received and used repeatedly in the form of cast mandrels such as 27.

Figure 6:
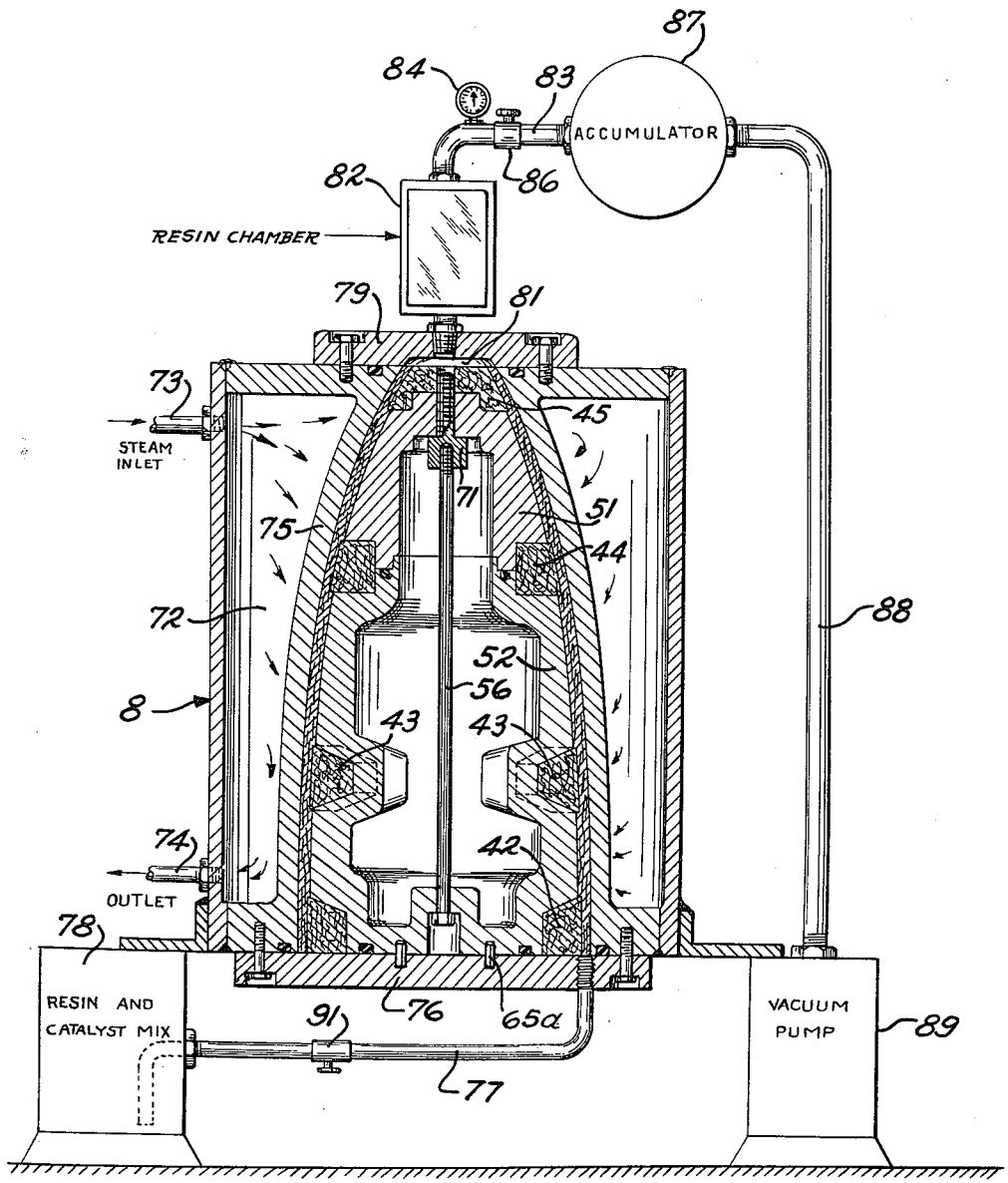
FIG. 6 is an elevation with parts in section showing another form of apparatus.

In that form of apparatus illustrated in FIG. 6, a mold assembly indicated in its entirety as at 8 is supported vertically with the large diameter of the tail cone at the bottom and resting upon a mold cover plate 76. In this form of apparatus there is no rotation of the mold assembly. The mandrel is made of low melting point alloy such as the castings 51 and 52 which are arranged within the conical mold portion 75. Reinforcing rings such as 42 and 44 are also provided in this form and the segmental supporting bosses such as 43 are also supported within the mandrel. The mandrel sections 51 and 52 are secured to each other by a through bolt 56 which is threaded into the head of bolt 71 as in the preceding embodiment.

A top cover plate 79 is secured to the mold assembly 8 and is provided centrally thereof with a chamber 81 which opens into the mold cavity for the conical shell. A vacuum pump 89 is provided and the pump is connected by conduit 88 to an accumulator 87. A line leads from the chamber 81 at the interior of the mold cavity upwardly through a resin chamber 82 having a window therein and thence through conduit 83 to the accumulator. A pressure gauge 84 is in the line 83 and a valve 86 is also placed in the line 83 to control the vacuum effective at the interior of the conical mold cavity. The bottom cover 76 of the mold assembly 8 is provided with a line 77 leading to a resin and catalyst supply 78. A valve 91 is provided in the line 77 to control the flow of resin and catalyst mix to the interior of the conical mold cavity. The mold assembly is provided with a steam inlet 73 and steam outlet 74 so as to maintain a predetermined temperature in the chamber 72 and thus control the curing of the conical shell in the mold 75.

In the manufacture of conical shells with the apparatus of FIG. 6 a pre-form is arranged within the mold 75 substantially as described in connection with the form of the invention shown in FIG. 5. The low melting point alloy mandrel is arranged at the interior of the pre-form as in the preferred embodiment and is held in assembled position by the cover plate 76 and pins 65a to maintain the mandrel concentric with the walls of the mold cavity. The valve 91 is opened to introduce resin and the vacuum pump 89 is set in operation and the valve 86 is opened. As the pressure within the mold cavity is reduced, the resin and catalyst mix is moved into the mold cavity. The resin is introduced at the large diameter and the liquid resin and catalyst moves the air within the mold upwardly and the air is led out of the mold cavity by way of conduit 83.

The introduction of resin by operation of the vacuum pump is continued until resin appears in the window in the resin chamber 82. The valves 86 and 91 are then closed and steam is introduced at 25 pounds per square inch through the steam inlet 73 so as to maintain a temperature of about 220° F. to 250° F. effective to cure the resin in the mold cavity. After curing the cover plate 76 is removed and the mandrel with the cured cone thereon is removed from the mold 75. As in the first described embodiment of the apparatus the cured conical section with the low melting point mandrel therein is subjected to steam at 50 pounds per square inch and a temperature of about 300° F. so as to melt out the mandrel.

In both forms of the apparatus which I have provided the resin is introduced at the large diameter of the tail cone cavity and such resin progressively fills the cavity in a manner which is effective to exhaust the air from the cavity at the small diameter end of the cone. A dense wall structure free of voids and resin concentration is produced by each of the methods and apparatus provided. In the centrifugal method illustrated in FIGS. 5 and 5a the wall cavity is filled with resin and surplus resin escaping through passageway 30 provides a visual indication of a complete mold filling. A corresponding visual indication of a filled mold cavity is provided by the method and apparatus of FIG. 6 wherein the window in the resin chamber 82 discloses the surplus resin.

Although I have shown and described two forms of my invention in considerable detail, it will be appreciated that numerous modifications may be made therein without departing from the scope of the invention as defined in the following claims:

What is claimed is:

1. Apparatus for making a resin-bonded fiber glass cone comprising a generally cylindrical housing, a mold within the housing having a smooth interior wall corresponding to the outer wall of the cone to be formed, said mold being horizontally mounted in said housing, a mandrel mounted within the mold coaxially thereof, said mandrel comprising complementary cast sections of a low melting point alloy and having an exterior wall spaced from the interior wall of the mold, said mandrel being closed at each end and having longitudinally spaced recesses at its exterior wall, a support fixture for said housing at the large diameter end of the conical mold comprising spaced rollers engaging the exterior of said cylindrical housing at the said end of the housing, a cover plate at the other end of said housing, said cover plate having a horizontally disposed tubular stem carried thereby, a support fixture beneath said tubular stem, bearings carried by said last mentioned support fixture and mounting said tubular stem for rotation in the fixture, a cover plate for said mold at said large diameter end thereof, an opening in said last-named cover plate at the center thereof, means to introduce liquid resin through said opening, means to pass excess resin centrally from the mold at the small diameter end thereof, means to rotate said housing, mold and the mandrel carried thereby during the introduction of resin, and means to introduce steam through said stem and into said housing to cure the shell within the mold.

2. Apparatus for making a resin-bonded fiber glass cone comprising a generally cylindrical housing, a mold within the housing having a smooth interior wall corresponding to the outer wall of the cone to be formed, said mold being horizontally mounted in said housing, a mandrel supported at opposite ends thereof within the mold and coaxially of the mold, said mandrel having longitudinally spaced recesses at its periphery, said mandrel comprising two complementary cast sections of a low melting point alloy, means to clamp said sections to each other, each of said mandrel sections being closed at the respective end of the mold, a support fixture for said housing at the large diameter end of the conical mold comprising an upright U-shaped member having spaced rollers thereon engaging the exterior of said cylindrical housing at one end of the housing, a cover plate at the other end of said housing, said cover plate having a horizontally disposed stem carried thereby, a support fixture beneath said tubular stem, bearings carried by said support fixture and mounting said stem for rotation on the fixture, a cover plate for said mold at said one end thereof, said cover plate having an opening at the center thereof, means to introduce liquid resin through said opening, means to pass excess resin from the mold at the small diameter end thereof, means to rotate said housing, mold and mandrel carried thereby during the introduction of resin, and means to introduce steam into the space between said housing and said mold to cure the shell within the mold.

3. Apparatus for making a resin-bonded fiber glass cone comprising a generally cylindrical housing, a mold within the housing having a smooth interior wall corresponding to the outer wall of the cone to be formed, said mold being horizontally mounted in said housing, a mandrel mounted within the mold coaxially thereof, said mandrel comprising complementary cast sections of low melting point alloy and having an exterior wall spaced from the interior wall of the mold, said mandrel being closed at each end and having longitudinally spaced recesses at its exterior wall, a support fixture for said housing comprising means rotatably supporting said housing at the large diameter end of the mold, a cover plate at the other end of said housing, said cover plate having a horizontally disposed tubular stem carried thereby, a support fixture beneath said tubular stem, bearings carried by said last-mentioned support fixture and mounting said tubular stem for rotation in the fixture, a cover plate for said mold at the large diameter end thereof, an opening in said last-named cover plate at the center thereof, means to introduce liquid resin through said opening, means to pass excess resin centrally from the mold at the small diameter end thereof, means to rotate said housing, mold and the mandrel carried thereby during the introduction of resin, and means to introduce steam through said stem and into said housing to cure the shell within the mold.

References Cited in the file of this patent

UNITED STATES PATENTS

| | | |
|---|---|---|
| 1,270,886 | Siptrott | July 2, 1918 |
| 1,343,191 | Allcutt | June 15, 1920 |
| 1,870,661 | Vogt | Aug. 9, 1932 |
| 1,998,897 | Kay | Apr. 23, 1935 |
| 2,370,953 | Greenberg | Mar. 6, 1945 |
| 2,448,294 | Blanchard | Aug. 31, 1948 |
| 2,596,120 | Boyle | May 13, 1952 |
| 2,602,191 | Joy | July 8, 1952 |
| 2,836,848 | Zink et al. | June 3, 1958 |
| 2,853,038 | Hess | Sept. 23, 1958 |
| 2,859,151 | Usab et al. | Nov. 4, 1958 |
| 2,945,531 | Balcom et al. | July 19, 1960 |
| 2,970,343 | Johnson et al. | Feb. 7, 1961 |